May 27, 1924. 1,495,460
A. R. THOMPSON
APPARATUS FOR SEPARATING LEAKS FROM TIGHT CANS
Filed Nov. 7, 1923 3 Sheets-Sheet 1

Inventor.
Albert R. Thompson.
By Booth & Booth,
Attorneys.

May 27, 1924.

A. R. THOMPSON 1,495,460

APPARATUS FOR SEPARATING LEAKS FROM TIGHT CANS

Filed Nov. 7, 1923   3 Sheets-Sheet 2

Inventor:
Albert R. Thompson,
By Booth & Booth,
Attorneys.

May 27, 1924.  
A. R. THOMPSON  
APPARATUS FOR SEPARATING LEAKS FROM TIGHT CANS  
Filed Nov. 7, 1923  
1,495,460  
3 Sheets-Sheet 3

Inventor,  
Albert R. Thompson.  
By Barth & Barth,  
Attorneys.

Patented May 27, 1924.

1,495,460

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

APPARATUS FOR SEPARATING LEAKS FROM TIGHT CANS.

Application filed November 7, 1923. Serial No. 673,392.

*To all whom it may concern:*

Be it known that I, ALBERT R. THOMPSON, a citizen of the United States, residing at San Jose, in the county of Santa Clara and State of California, have invented certain new and useful Improvements in Apparatus for Separating Leaks from Tight Cans, of which the following is a specification.

My invention relates to an apparatus for separating "leaks" from "tight" product-filled sealed cans.

The object of my invention is to provide a machine capable of operating continuously to advance a series of product-filled sealed cans, to successively and automatically select from said series of advancing cans the leaky cans, known in the art as "leaks", and to separately discharge the leaks and the tight, or perfect cans. A further object of my invention is to provide such a machine which is capable of acting successfully upon the cans immediately subsequent to the cooking or other heating process, or immediately subsequent to the pressure cooling process, so that the leaks may be separated at once, and the tight cans immediately conveyed to the labeling machine, packed in cases, and placed in the cars for shipment.

It is the present practice, particularly in the canning of milk and other food products, to stack the sealed and finally processed cans for a sufficient length of time, often as much as three weeks or longer, to enable the product in the leaky cans to begin to ferment, thereby causing such cans to swell, and thus permit them to be distinguished from the tight cans. The leaks or "swells" are then removed by hand, the entire batch of cans, both tight and leaks, being examined for this purpose. This procedure not only entails considerable labor, in the sorting of the cans, but also delays their shipment, thereby tying up capital and necessitating the provision of storage space. By the employment of a machine embodying my present invention, such labor and storage are eliminated, it being possible to ship the tight cans immediately after the final processing.

My invention comprises, broadly, an apparatus for automatically separating the cans according to the extent to which their ends are bulged. When the sealed cans come from the cooker or other heating effect, the ends of the tight cans are temporarily bulged outwardly by the increased pressure within, caused by the heating of the contents, whereas the ends of the leaky cans are flat, or normal, the interior pressure having leaked out. When the cans emerge from the pressure cooler, or other device in which they are subjected to exterior fluid pressure, however, a similar but opposite effect takes place, i. e. the ends of the leaky cans are temporarily bulged, the pressure of the cooling chamber having leaked into the cans, and therefore bulging their ends when they are removed from the pressure chamber until such interior pressure again leaks out, whereas the tight cans come from the cooler with flat or dished ends; the interior pressure having been reduced by the cooling of the contents. This difference in the end bulge of the cans is not great enough to be readily detected by the eye, especially when the cans are traveling at the rate of one hundred per minute, as is common practise at the present time, but by the use of my machine the cans are separated, accurately and automatically, according to whether or not their ends are bulged by even a slight amount.

My machine may be used, therefore, to separate the leaks from the tight cans as they come from the cooker or other heating effect, or as they come from the pressure cooler, or two machines may be used, one following the cooker and the other following the pressure cooler, so that any leaks which escape the first separation, or which develop in the cooler, are separated in the second machine. My machine may also be used, if desired, to separate the swells from the tight cans at any time after the final processing, as will become apparent from the following specification. It is to be understood, moreover, that the form and construction of the machine may be varied within the limits of the claims hereto appended, from that hereinafter shown and described, without departing from the spirit of the invention as expressed in said claims.

A machine embodying my invention will now be fully described with reference to the accompanying drawings, wherein—

Figure 1:
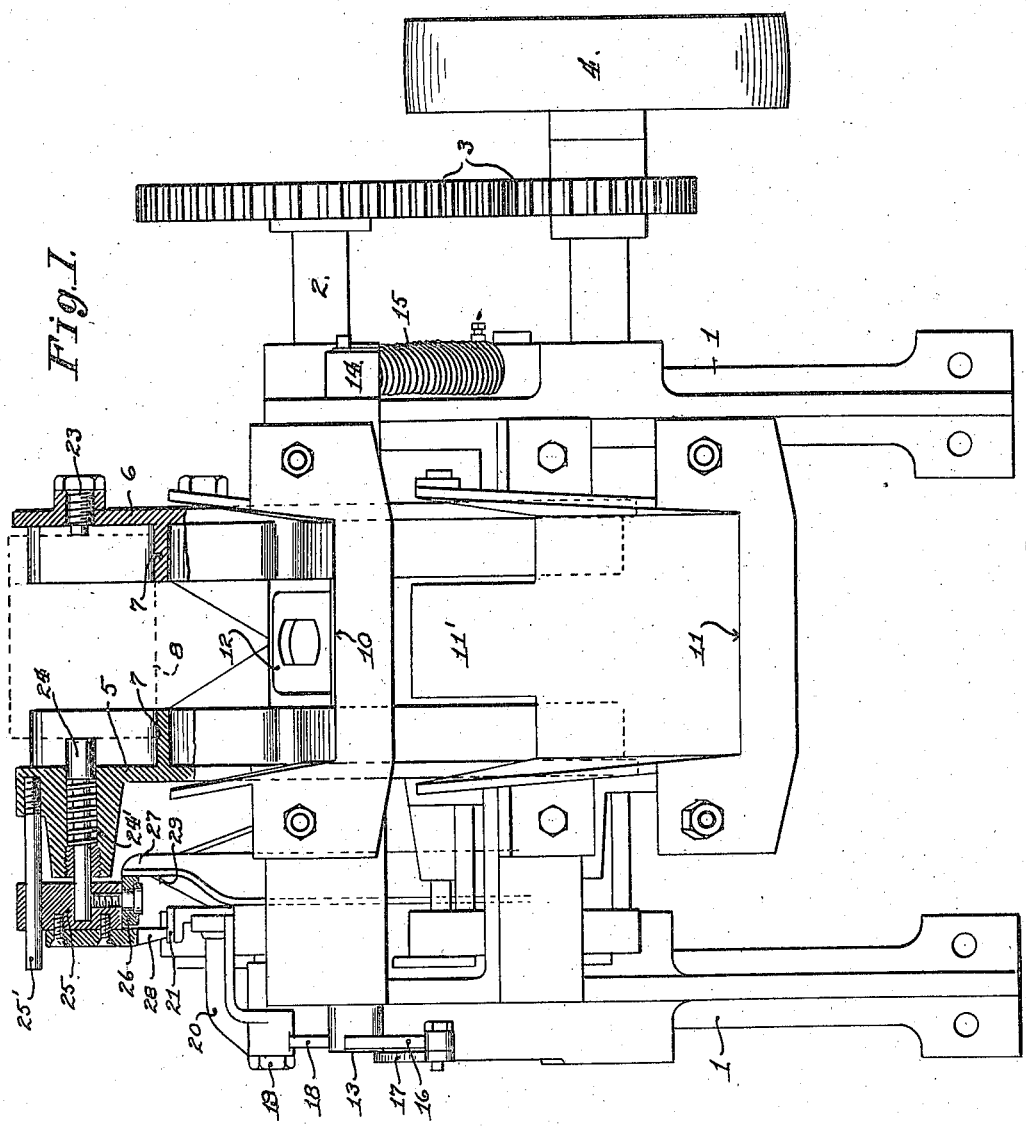
Fig. 1 is a part sectional end elevation of my apparatus as viewed from the discharge end.

In the drawings, the reference numeral 1 designates a frame, in which is journaled a horizontal shaft 2, said shaft being continuously rotated by gearing 3 from a power receiving member, as for example, a pulley 4, as shown in Fig. 1. Fixed upon the shaft 2 is a turret comprising a pair of spaced disk members 5 and 6, each having radially disposed pockets 7, Figs. 1, 2 and 3, formed on its inner face, the pockets of said members lying opposite each other and being adapted for the reception of the cans indicated in dotted lines at 8 in Figs. 1 and 2.

Figure 2:
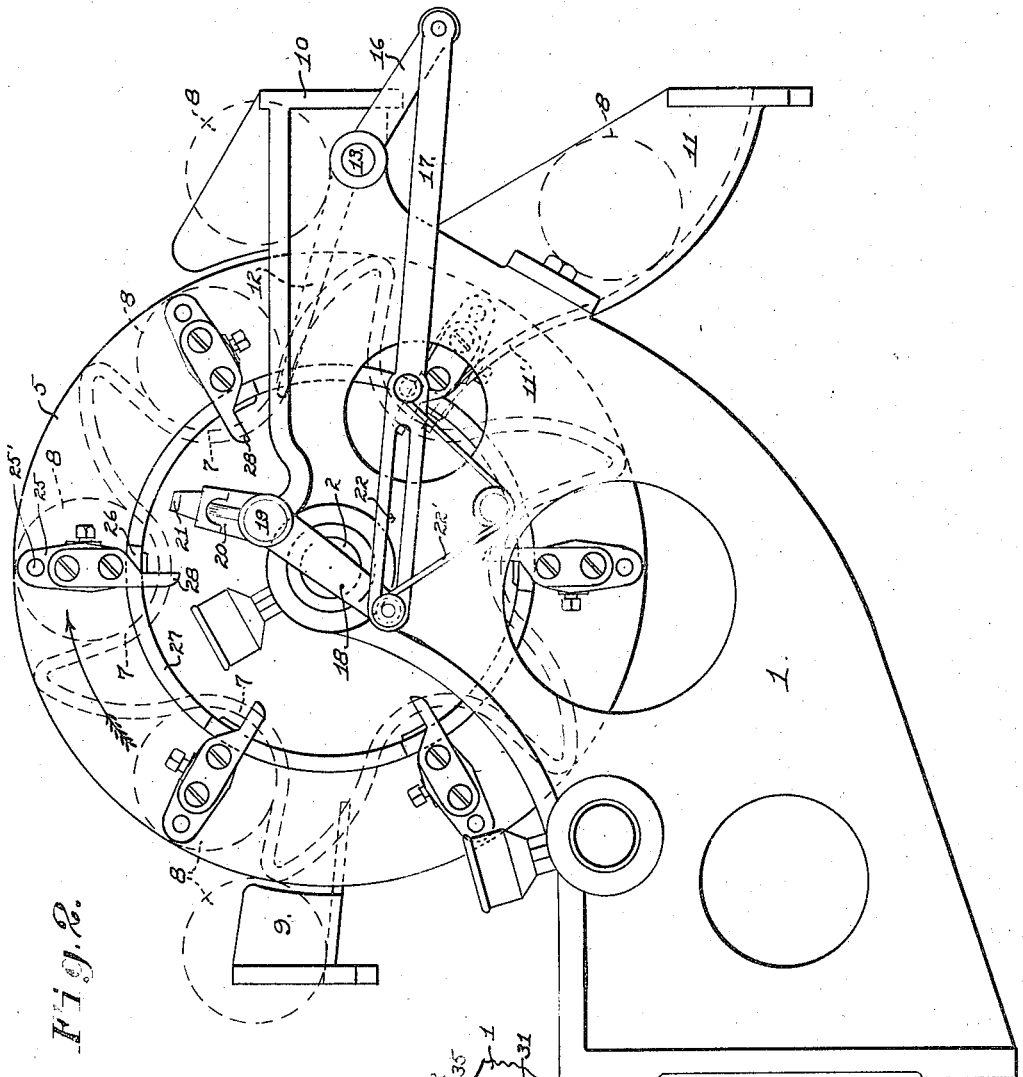
Fig. 2 is a side elevation.

The cans 8 are fed into the pockets 7 successively in any desired manner, as for example, by an inclined chute 9, Fig. 2, and are carried by said pockets to either one of two separate discharge chutes 10 and 11, the chute 10 being positioned above the chute 11. If the cans are permitted to rest undisturbed in the pockets 7, they are discharged by gravity into the lower chute 11, said chute having an inwardly extending tongue 11', lying between the turret disks 5 and 6, and adapted to receive the cans from the pockets 7; but in order to divert certain cans to the upper chute 10 there is provided a swinging gate 12, Figs. 1 and 2 extending between the turret disks 5 and 6, and secured to a transverse shaft 13. Said gate, when swung into its lower position, as indicated in Fig. 2, lies in the path of the cans, and diverts them from the pockets 7 to the upper chute 10, but when elevated, by mechanism to be presently described, occupies a position above the path of the cans, and permits said cans to pass beneath it to the lower chute 11.

Figure 6:
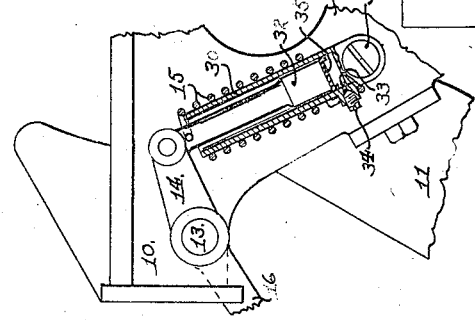
Fig. 6 is a part sectional detail of the gate retaining spring and dash pot.

The gate shaft 13 carries an arm 14, Figs. 1 and 6, at one end, upon which operates a spring 15 to normally keep the gate in its lowermost position. The other end of the shaft 13 also carries an arm 16, Figs. 1 and 2, connected by a link 17 with a lever 18, said lever being fulcrumed upon a stud 19 and having an upper extension 20 which carries a dog or trip 21. The connection between the link 17 and the lever 18 is a sliding one, formed by a slot 22 in said link, so that the lever 18 may move in one direction without affecting said link. A spring 22' normally retains the lever 18 at the extreme left hand end of said slot 22, as shown in Fig. 2.

Figure 3:
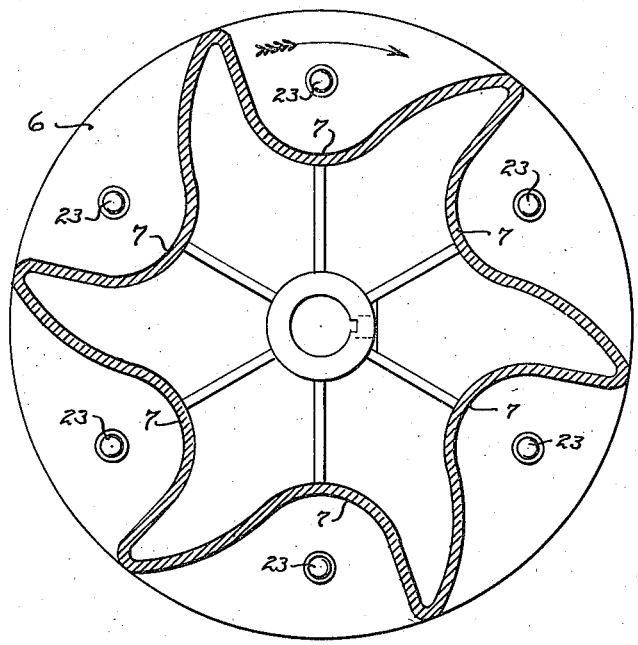
Fig. 3 is a longitudinal section of the can advancing turret.

The turret disk 6 has a series of adjustable stop screws 23, Figs. 1 and 3, one positioned at the approximate center of each pocket 7. The other disk 5 carries a series of laterally movable plungers 24, one being shown in detail in Fig. 1, positioned opposite the stop screws 23, said plungers being forced inwardly, against the can ends, by springs 24', and the other ends of the cans being forced against the stop screws 23. The outer end of each plunger 24 carries a cross-head 25, which slides upon and is guided by a fixed stud 25', and said cross head 25 carries a roller 26, adapted to travel upon the face of a stationary cam 27, by means of which the plunger 24 is held out of contact with the can end for the greater part of the revolution of the turret. Each plunger cross-head 25 also carries a projecting finger 28, which may, under certain conditions to be presently described, engage the trip 21 of the lever 20 as the turret revolves.

Figure 4:
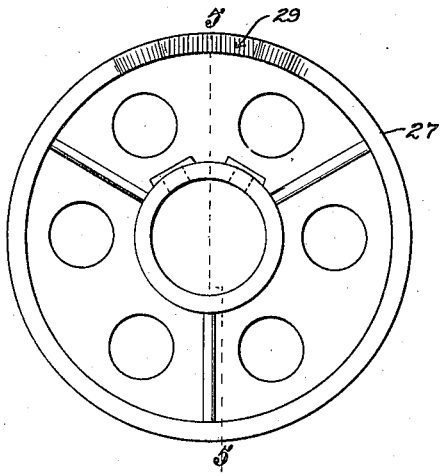
Fig. 4 is a side elevation, reduced in size, of the stationary cam.
Figure 5:
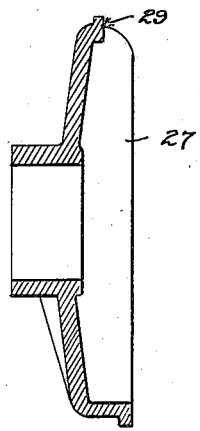
Fig. 5 is a section taken on the line 5—5 of Fig. 4.

The cam 27 has a depressed portion 29, Figs. 1, 4 and 5, which permits the plunger 24 to be moved, by its spring 24', into contact with the can end. If the ends of that particular can are not bulged outwardly, the plunger 24 will be forced inwardly to such an extent that its finger 28 engages the trip 21 of the lever 20, as shown in Fig. 1, and as the turret continues to revolve, said lever 20 will be moved, thereby elevating the gate 12 in time to allow the non-bulged can to pass beneath it and continue in the pocket 7 to the lower discharge chute 11. The cam 27 is so shaped that the plunger 24 is withdrawn from the can end as soon as the finger 28 has actuated the lever 20, so that the can rolls freely out of its pocket 7 in either discharge position.

If, however, the ends of the can are bulged, the plunger 24 will be held out far enough, by contact with the bulged can end, to cause the finger 28 to miss the trip 21, so that the gate 12 is not elevated, and the bulged can is engaged by and rolls out upon said gate into the upper discharge chute 10. Each successive can is acted upon in the manner described, with the result that the bulged cans are discharged into the upper chute 10, and the flat-end cans into the lower chute 11. Therefore, if the machine is operating upon cans coming from a cooker or other heating effect, the leaks will be discharged into the lower chute 11, and the tight cans into the upper chute 10; but if it is operating on cans coming from a pressure cooler, the leaks will come out in the upper chute 10, and the tight cans in the lower chute 11. The degree of end bulge which causes the cans to be discharged into the lower chute 11 can be regulated by adjusting the stop screws so that an accurate separation is effected between the leaks and the tight cans.

The gate 12 is provided with a dash pot, to cushion its downward return movement.

Said dash pot comprises a cylindrical 30, Fig. 6, preferably positioned within the spring 15 and pivotally secured to the frame by a stud 31, and a piston 32 operating within said cylinder, and connected with the arm 14 of the shaft 13. The cylinder 30 is provided with an air port 33 adjustably controlled by a set screw 34, so that the cushioning effect of the dash pot may be regulated. The admission of air to the cylinder 30 on the up-stroke of the piston 32 is facilitated by any suitable means, as for example a cup-leather 35 upon said piston.

The gate operating mechanism is protected against accidental backward rotation of the turret by the slot 22 of the link 17, said slot permitting the lever 18 to move freely in the reverse direction.

I claim:

1. An apparatus for separating leaks from tight cans comprising a rotating turret adapted to receive, advance, and discharge a series of cans; a member adapted to be moved into the path of said cans for removing them from said turret in advance of their normal discharge position; and mechanism controlled by the size of the cans for actuating said removing member.

2. An apparatus for separating leaks from tight cans comprising a rotating turret adapted to receive, advance, and discharge a series of cans; a member adapted to be moved into the path of said cans to remove them from said turret in advance of their normal discharge position; and mechanism controlled by a difference in end bulge of the cans for actuating said removing member.

3. An apparatus for separating leaks from tight cans comprising a rotating turret adapted to receive, advance, and discharge a series of cans; a member adapted to be moved into the path of said cans to remove them from said turret in advance of their normal discharge position; and devices carried by said turret for operating said removing member according to a difference in end bulge of the cans.

4. An apparatus for separating leaks from tight cans comprising a rotating turret having a can receiving pocket; means for positively ejecting a can from said pocket; and mechanism controlled by the degree of end bulge of the can for actuating said ejecting means.

5. An apparatus for separating leaks from tight cans comprising a rotating turret having a can receiving pocket; means for positively ejecting a can from said pocket; and mechanism carried by the turret and adapted to coact with the ends of the can for actuating said ejecting means according to the degree of end bulge of said can.

6. An apparatus for separating leaks from tight cans comprising a rotating turret having a can receiving pocket; means for removing a can from said pocket; a pair of spaced members carried by the turret and adapted to coact with the ends of the can; and connections between one of said members and said removing means for actuating the latter according to the degree of end bulge of the can.

7. An apparatus for separating leaks from tight cans comprising a rotating turret having a can receiving pocket; means for removing a can from said pocket; means carried by the turret for abutting against one end of the can; a movable member carried by the turret for coacting with the other end of the can; and connections between said movable member and said removing means for actuating the latter according to the degree of end bulge of the can.

8. An apparatus for separating leaks from tight cans comprising a rotating turret having a can receiving pocket; means for removing a can from said pocket; an adjustable member carried by the turret for abutting against one end of the can; a movable member carried by the turret for coacting with the other end of the can; and connections between said movable member and said removing means for actuating the latter according to the degree of end bulge of the can.

9. An apparatus for separating leaks from tight cans comprising a turret having a can receiving pocket; means for removing a can from said pocket; a trip for operating said removing means; and a member carried by the turret and adapted to coact with the end of the can, said member being positioned to engage said trip only when in contact with a can having a pre-determined degree of end bulge.

10. An apparatus for separating leaks from tight cans comprising a turret having a can receiving pocket; means for removing a can from said pocket; a trip for operating said removing means; a member carried by the turret and adapted to coact with the end of the can, said member being positioned to engage said trip only when in contact with a can having a pre-determined degree of end bulge; means for holding said member in contact with the can end; and means for withdrawing said member out of such contact while the can is being received in and removed from said pocket.

In testimony whereof I have signed my name to this specification.

ALBERT R. THOMPSON.